US010340780B2

(12) United States Patent
Ueda et al.

(10) Patent No.: US 10,340,780 B2
(45) Date of Patent: Jul. 2, 2019

(54) TRANSVERSE FLUX MACHINE

(71) Applicant: Kabushiki Kaisha Toshiba, Minato-ku (JP)

(72) Inventors: Yasuhito Ueda, Yokohama (JP); Hiroshi Takahashi, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 449 days.

(21) Appl. No.: 15/059,684

(22) Filed: Mar. 3, 2016

(65) Prior Publication Data
US 2016/0276880 A1    Sep. 22, 2016

(30) Foreign Application Priority Data

Mar. 19, 2015 (JP) .................. 2015-056976

(51) Int. Cl.
*H02K 21/14* (2006.01)
*H02K 29/03* (2006.01)

(52) U.S. Cl.
CPC ........... *H02K 29/03* (2013.01); *H02K 21/145* (2013.01); *H02K 2201/06* (2013.01); *H02K 2213/03* (2013.01)

(58) Field of Classification Search
CPC .. H02K 29/03; H02K 21/145; H02K 2201/06; H02K 2213/03
USPC ........................................................ 310/46
See application file for complete search history.

(56) References Cited

U.S. PATENT DOCUMENTS

| | | | |
|---|---|---|---|
| 5,886,449 A | 3/1999 | Mitcham | |
| 6,097,127 A * | 8/2000 | Rivera | H02K 3/28 310/156.12 |
| 6,229,238 B1 | 5/2001 | Graef | |
| 7,034,422 B2 * | 4/2006 | Ramu | H02K 1/246 310/112 |
| 7,042,227 B2 * | 5/2006 | Mir | B62D 5/046 318/432 |
| 7,952,252 B2 | 5/2011 | Kang et al. | |

(Continued)

FOREIGN PATENT DOCUMENTS

| | | |
|---|---|---|
| JP | 07-227075 | 8/1995 |
| JP | 9-117116 | 5/1997 |

(Continued)

*Primary Examiner* — Forrest M Phillips
(74) *Attorney, Agent, or Firm* — Oblon, McClelland, Maier & Neustadt, L.L.P.

(57) ABSTRACT

According to one embodiment, a transverse flux machine includes a stator and a rotor. The stator includes a winding and a first ferromagnetic unit. The winding is wound along a rotational direction of a rotation axis. The first ferromagnetic unit has L (L is integer number) magnetic poles holding the winding. The rotor is rotatable relatively to the stator around the rotation axis. The rotor includes a second ferromagnetic unit having L magnetic poles facing the first ferromagnetic unit. If an order of harmonic component of torque ripple to be reduced is (N×1), (N×2), . . ., (N×(M−1)) (M and N are integer numbers. M ≤ L), among L magnetic poles in the first and second ferromagnetic units, a relative position of M magnetic poles along the rotational direction is shifted by Θ1 ((180°/N/M)< Θ1 < (540°/N/M)) in order.

7 Claims, 14 Drawing Sheets

(56) References Cited

U.S. PATENT DOCUMENTS

| | | | |
|---|---|---|---|
| 8,760,023 B2* | 6/2014 | Calley | H02K 1/145 310/156.02 |
| 9,742,243 B2* | 8/2017 | Fairall | H02K 9/193 |
| 2004/0075357 A1 | 4/2004 | Kastinger et al. | |
| 2010/0123426 A1* | 5/2010 | Nashiki | H02K 1/12 318/701 |
| 2011/0169366 A1 | 7/2011 | Calley et al. | |
| 2012/0091940 A1* | 4/2012 | Nashiki | H02K 19/103 318/701 |
| 2014/0035401 A1* | 2/2014 | Nadeau | H02K 1/145 310/46 |
| 2014/0062242 A1 | 3/2014 | Li et al. | |

FOREIGN PATENT DOCUMENTS

| | | |
|---|---|---|
| JP | 3052642 | 7/1998 |
| JP | 2004-516780 | 6/2004 |
| JP | 2009-201259 | 9/2009 |
| JP | 2009-247180 | 10/2009 |
| JP | 4743718 | 8/2011 |
| JP | 2013-523073 | 6/2013 |
| JP | 2014-103793 | 6/2014 |

* cited by examiner

US 10,340,780 B2

TRANSVERSE FLUX MACHINE

CROSS-REFERENCE TO RELATED APPLICATION

This application is based upon and claims the benefit of priority from Japanese Patent Application No. 2015-056976, filed on Mar. 19, 2015; the entire contents of which are incorporated herein by reference.

FIELD

Embodiments described herein relate generally to a transverse flux machine.

BACKGROUND

In technical field of a rotary electric machine (Hereinafter, it is called "a machine"), request for reduction of a torque ripple is high. Because the torque ripple causes vibration occurred around the machine. In conventional technique of a transverse flux machine, the torque ripple is large, which is a problem.

DETAILED DESCRIPTION

According to one embodiment, a transverse flux machine includes a stator and a rotor. The stator includes a wincing and a first ferromagnetic unit. The winding is wound along a rotational direction of a rotation axis. The first ferromagnetic unit has L (L is integer number) magnetic poles holding the winding. The rotor is rotatable relatively to the stator around the rotation axis. The rotor includes a second ferromagnetic unit having L magnetic poles facing the first ferromagnetic unit. If an order of harmonic component of torque ripple to be reduced is $(N \times 1), (N \times 2), \ldots, (N \times (M-1))$ (M and. N are integer numbers. $M \leqslant L$), among L magnetic poles in the first and second ferromagnetic units, a relative position of M magnetic poles along the rotational direction is shifted by $\Theta 1 ((180°/N/M) < \Theta 1 < (540°/N/M))$ in order.

Various embodiments will be described hereinafter with reference to the accompanying drawings.

(The First Embodiment)

Figure 1:
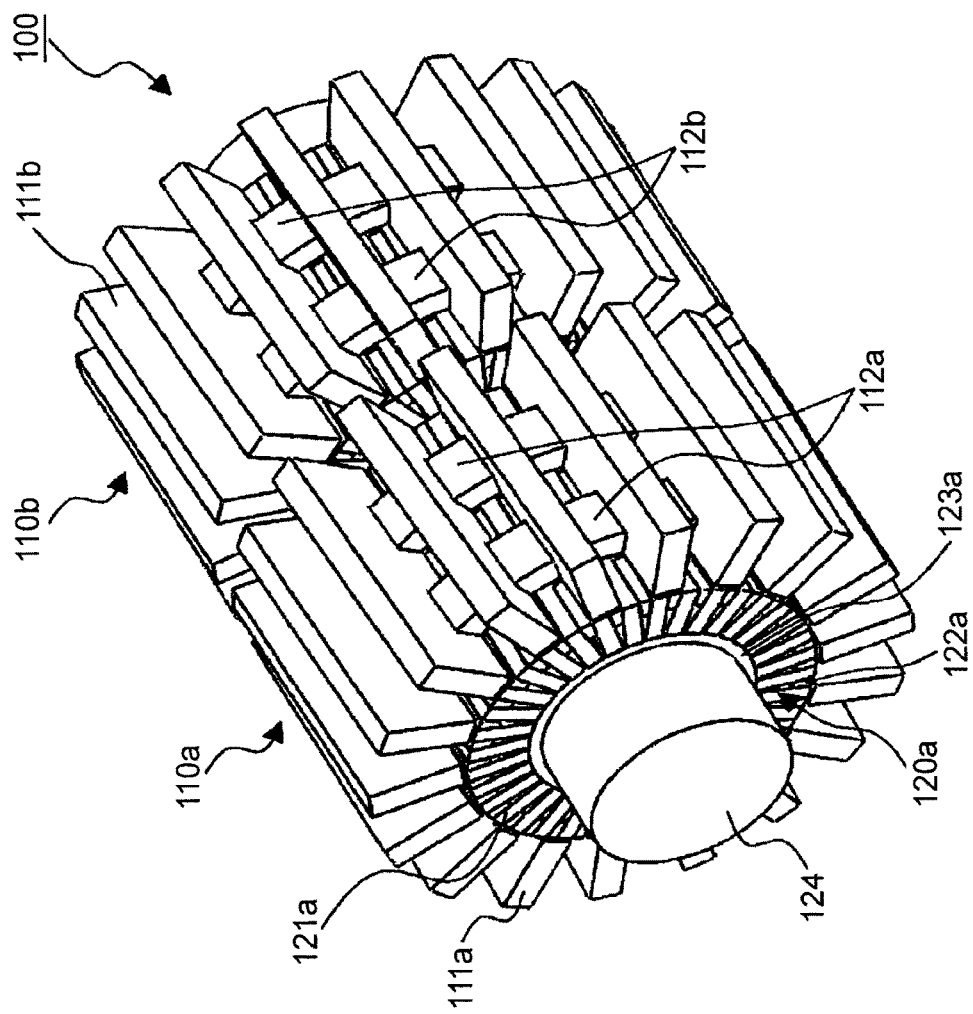
FIG. 1 is a perspective view showing a transverse flux machine according to a first embodiment.
Figure 2:
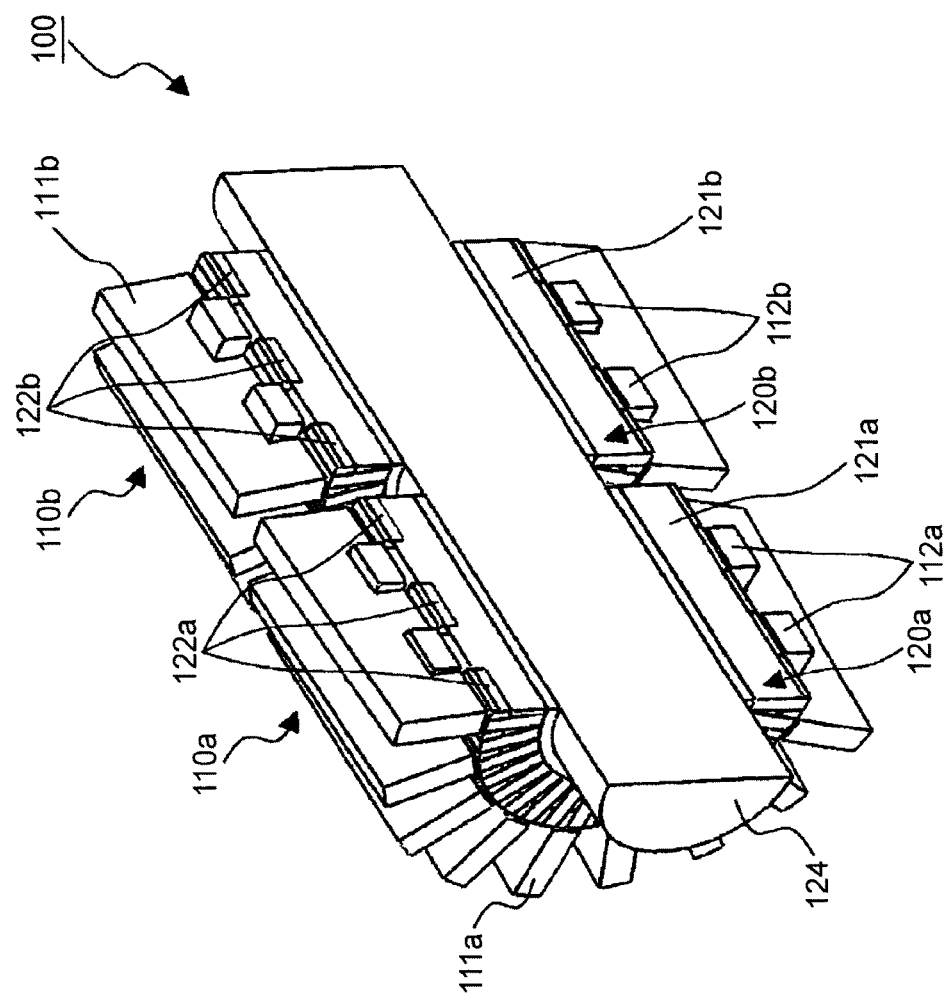
FIG. 2 is a perspective sectional view showing the transverse flux machine according to the first embodiment.

FIG. 1 is a perspective view showing a transverse flux machine according to the first embodiment. FIG. 2 is a perspective sectional view showing the transverse flux machine according to the first embodiment.

A transverse flux machine 100 is structured as two-phases, and includes stators 110a~b and rotors 120a~b. Namely, a pair of one stator and one rotor corresponds to one phase. A stator 110a and a rotor 120a (both represented by a sign "a") are "a-phase". A stator 110b and a rotor 120b (both represented by a sign "b") are "b-phase". These compose "two-phase structure".

The stators 110a~b respectively include ring-coil (winding) 112a~b and E-shaped iron core 111a~b.

The ring-coil 112a~b is a ring-shaped winding wound along a rotational direction around a rotation axis 124. Two ring-coils 112a~b are equipped with each phase, i.e., four ring-coils are totally equipped. As to two ring-coils of the same phase (i.e., two ring-coils 112a, two ring-coils 112b), two currents phases of which are different by 180° are preferably supplied (the phase difference is 180°).

E-shaped iron cores 111a~b surround (hold) the respective ring-shaped outer sides of two ring-coils 112a~b by two recessed parts of the E-shaped iron core. Both edges and a center of the E-shaped iron core are respectively a magnetic pole. A plurality of E-shaped iron cores is positioned on the ring-shaped ring-coil 112a~b along the rotational direction at a predetermined interval. On the ring-shaped ring-coil 112a~b, parts not surrounded by the E-shaped iron core 111a~b are facing an air gap.

In the first embodiment, as to the stators 110a~b, by the E-shaped iron cores 111a~b surrounding a part of the ring-coils 112a~b, a plurality of magnetic poles positioned along the rotational direction is called "a first ferromagnetic unit".

The rotors 120a~b are respectively positioned inside the first ferromagnetic unit (of the stators 110a~b) with an air gap. The rotors 120a~b are rotatable relatively to the stators 110a~b around the rotation axis 124.

The rotors 120a~b include non-magnetic rings 123a~b respectively surrounding the rotation axis 124. Furthermore, the rotors 120a~b include I-shaped iron cores 121a~b and permanent magnets 122a~b alternatingly positioned along ring-shaped outer sides of the non-magnetic rings 123a~b.

As to the direction of magnetization of the permanent magnet 122a~b of the same phase, respective phases of two permanent magnets positioned adjacently along the rotational direction (or the axial direction) are preferably different by 180° (the phase difference is 180°).

In the first embodiment, by the I-shaped iron cores 121a~b and the permanent magnets 122a~b in the rotors 120a~b, a plurality of magnetic poles (respectively facing the first ferromagnetic unit of the stators 110a~b) positioned along the rotation axis is called "a second ferromagnetic unit".

Figure 3:
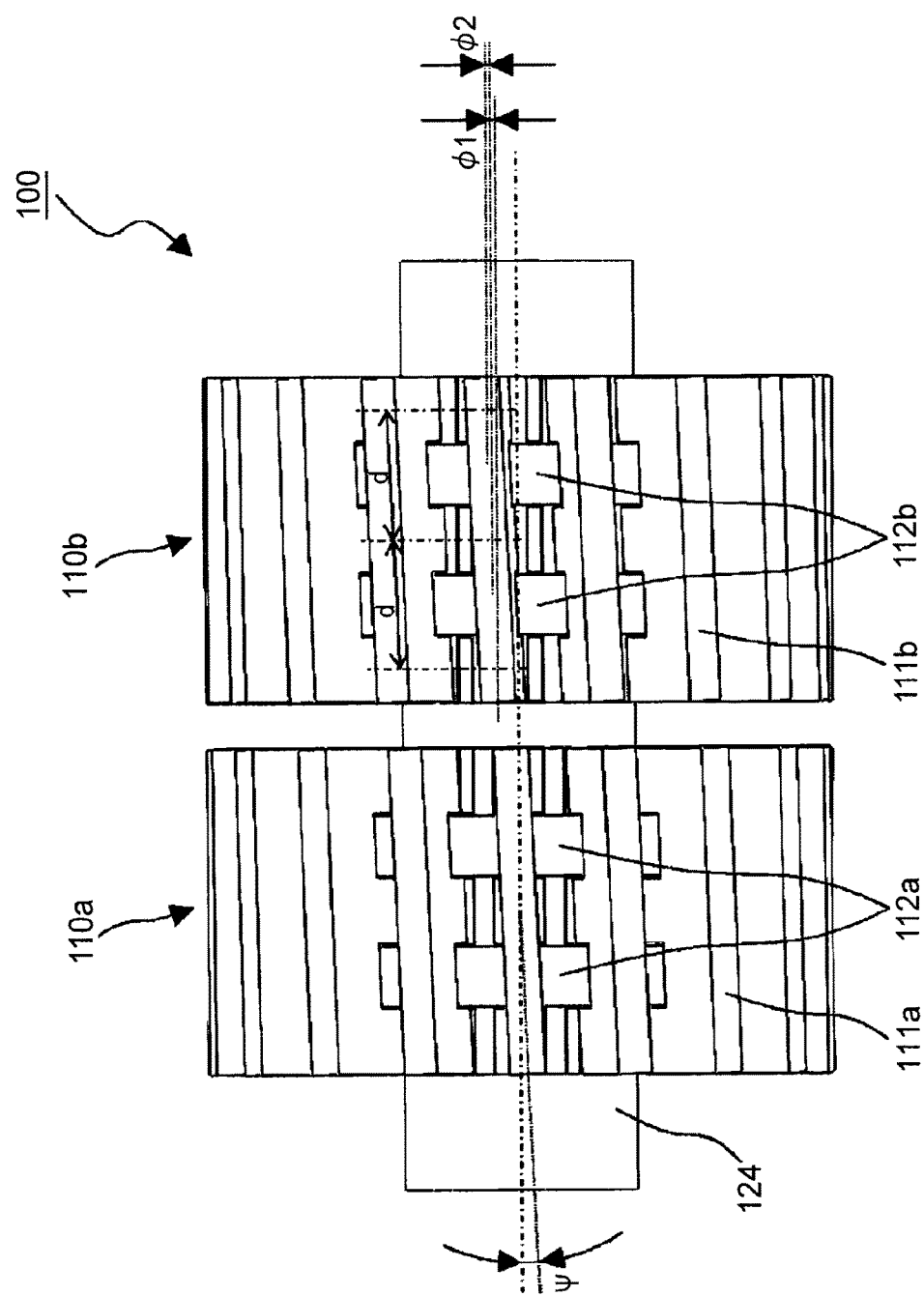
FIG. 3 is a front view showing the transverse flux machine according to the first embodiment.

FIG. 3 is a front view showing the transverse flux machine according to the first embodiment.

In the first embodiment, the E-shaped iron cores 111a~b of the stators 110a~b are inclined to the rotation axis 124. Namely, respective positions of three magnetic poles of the E-shaped iron core 111a~b are shifted (deviated) to the rotational direction. A mechanical angle of a shift (deviation) position along the rotation axis is called "a skew angle" which is represented as angle ϕ. In order to reduce a torque ripple having a cycle of mechanical angle θ, respective mechanical angles of three magnetic poles are shifted by θ/3.

More generally speaking, if L magnetic poles (L is the number of the magnetic poles) of the iron core of the stator exist along the axial direction, in order to reduce ripples of an order (N×1), (N×2), . . . , (N ×(M−1)) (M and N are integer numbers. M≤L) for the fundamental order of an electrical angle, among L magnetic poles, a relative position of respective centers of M magnetic poles along the rotational direction is shifted by the electrical angle "Θ1=(360°/N/M)" in order (1, 2, . . . , M). This is a principle to reduce the torque ripple in the first embodiment.

The number of magnetic poles of the E-shaped iron core $111a\sim b$ along the axial direction is respectively "L=3". For example, if the E-shaped iron core is composed by laminated steel sheets, the number of magnetic poles is "L=M" because of shape-constraint, i.e., "M=3". In order to reduce ripples of the fourth harmonic component (N=4) for two-phase structure, by assigning these values to above equation, the respective shifts are the electrical angle "Θ1=(360°/4/3)=30°". Here, two poles (i.e., twice the magnetic pole pitch) are represented as the electrical angle "360°".

If this is thought with the mechanical angle ϕ, for example, if the magnetic pole is designed as "one round is 36 poles (i.e., the number of magnetic pole pairs is 18)", a skew angle is determined so as to shift by "ϕ=(360°/18/4/3)=1.67°". In FIG. 3, this skew angle corresponds to "ϕ=ϕ1=ϕ2". Here, the skew angle ϕ is different from a tilt angle Ψ of the E-shaped iron core $111a\sim b$. The relationship between the skew angle and the tilt angle is represented as "rϕ=d·sin(Ψ)". In this equation, "r" is a distance between the most inner part of the E-shaped iron core $111a\sim b$ and a center of the rotation axis, and "d" is a distance between two magnetic poles positioned adjacently ("ϕ" and "Ψ" are radian-notation).

The relationship between the electrical angle and the mechanical angle is changed by the number of poles of the machine. For example, if the number of poles is 48, the number of magnetic pole pairs is 24, and the mechanical angle ϕ is "ϕ=(360°/24/4/3)=1.25°". Furthermore, both a-phase and b-phase preferably have a shift of the mechanical angle ϕ, and a phase difference between a-phase and b-phase is preferably the electrical angle 90°.

As to the electrical angle "Θ1=(360°/N/M)" in above equation, 360° represents the case that the most suitable angle is indicated. However, the angle may have a range.

Namely, if an order of harmonic component of torque ripple to be reduced is (N×1), (N×2), . . . , (N×(M−1)) (M and N are integer numbers. M≤L) for the fundamental order of the electrical angle along the rotational direction, among L magnetic poles facing along the axial direction in the first and second ferromagnetic units, a relative position of respective centers of M magnetic poles along the rotational direction may be shifted by the electrical angle "(180°/N/M)< Θ1 < (540°/N/M)" in order (1, 2, . . . ,M).

As mentioned-above, according to the transverse flux machine 100 of the first embodiment, when current is supplied or when current is not supplied, the torque ripple for the rotational position can be reduced.

(The Second Embodiment)

Figure 4:
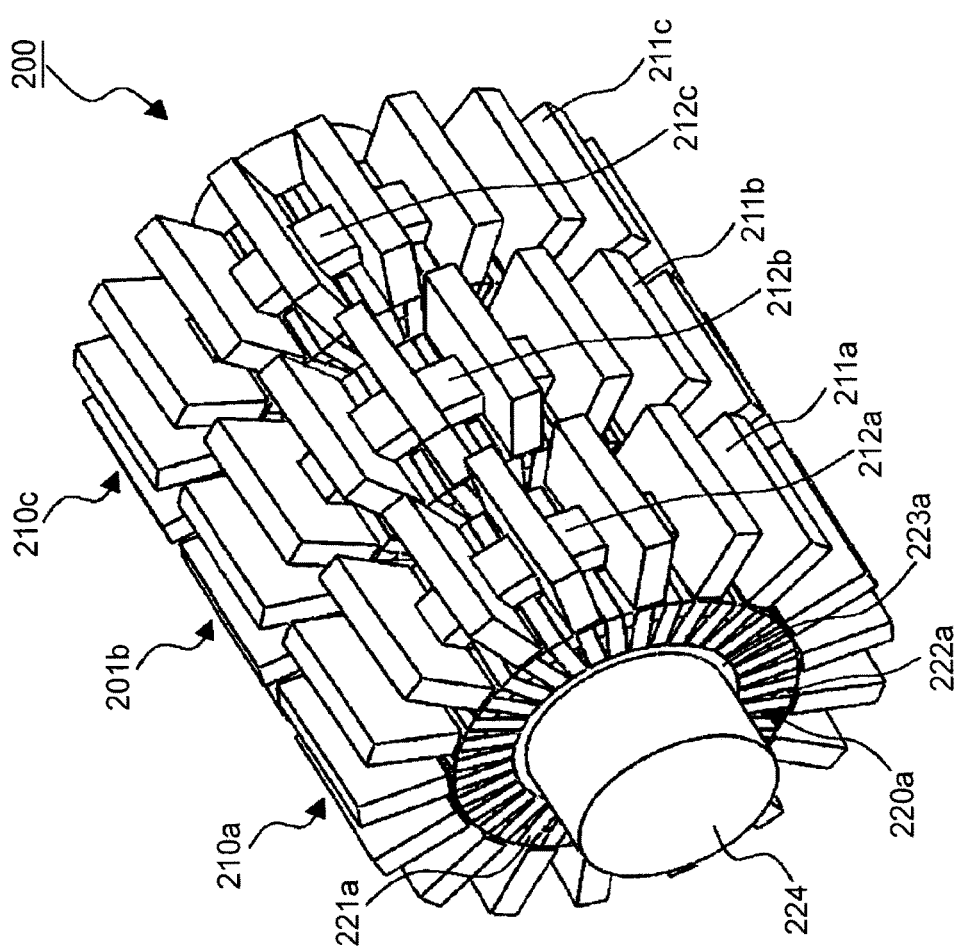
FIG. 4 is a perspective view showing a transverse flux machine according to a second embodiment.
Figure 5:
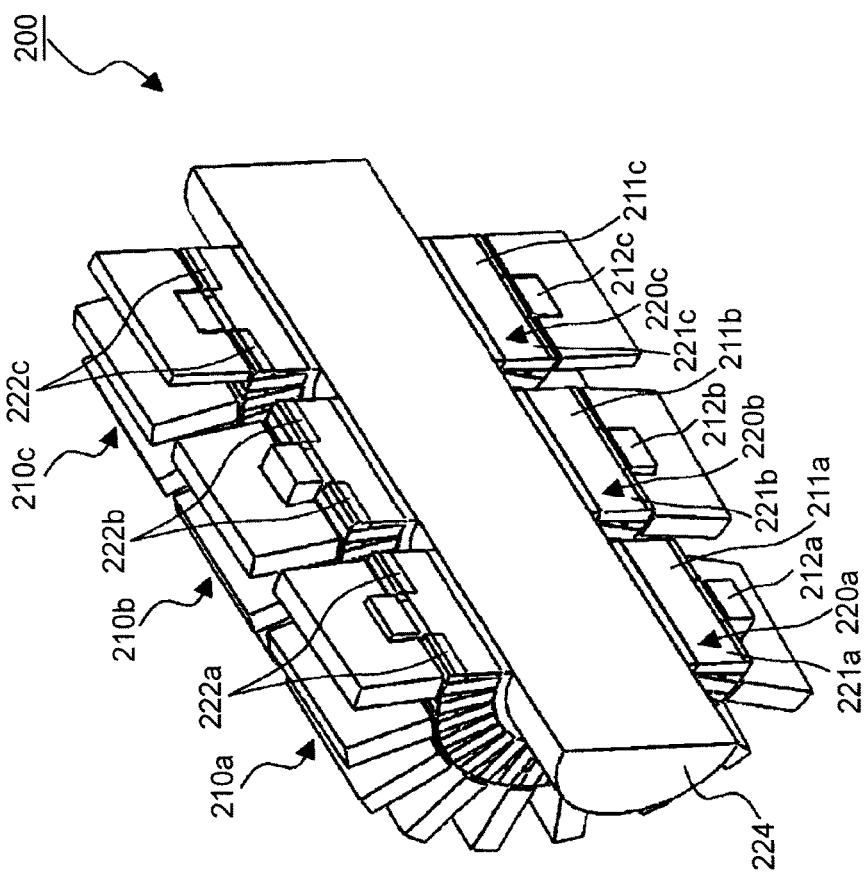
FIG. 5 is a front view showing the transverse flux machine according to the second embodiment.

FIG. 4 is a perspective view showing a transverse flux machine according to the second embodiment. FIG. 5 is a front view showing the transverse flux machine according to the second embodiment.

A transverse flux machine 200 is structured as three-phases, and includes stators $210a\sim c$ and rotors $220a\sim c$. A stator 210a and a rotor 220a (both represented by a sign "a") are "a-phase". A stator 210b and a rotor 220b (both represented by a sign "b") are "b-phase". A stator 210c and a rotor 220c (both represented by a sign "c") are "c-phase". These compose "three-phase structure".

The stators $210a\sim c$ respectively include ring-coil (winding) $212a\sim c$ and U-shaped iron core $211a\sim b$. The ring-coil $212a\sim c$ is a ring-shaped winding wound along a rotational direction around a rotation axis 224. One ring-coil $212a\sim c$ is equipped with each phase, i.e., three ring-coils are totally equipped.

U-shaped iron cores $211a\sim c$ surround (hold) the respective ring-shaped outer sides of three ring-coils $212a\sim c$ by a recessed part of the U-shaped iron core. Both edges of the U-shaped iron core are respectively a magnetic pole. A plurality of magnetic poles is positioned on the ring-shaped ring-coil $212a\sim c$ along the rotational direction at a predetermined interval. On the ring-coil $212a\sim c$, parts not surrounded by the U-shaped iron core $211a\sim c$ are facing an air gap.

In the second embodiment, as to the stators $210a\sim c$, by the U-shaped iron cores $211a\sim c$ surrounding a part of the ring-coils $212a\sim c$, a plurality of magnetic poles positioned along the rotational direction is called "a first ferromagnetic unit".

The rotors $220a\sim c$ are respectively positioned inside the first ferromagnetic unit (of the stators $210a\sim c$) with an air gap. The rotors $220a\sim c$ are rotatable relatively to the stators $210a\sim c$ around the rotation axis 224.

The rotors $220a\sim c$ include non-magnetic rings $223a\sim c$ respectively surrounding the rotation axis 224. Furthermore, the rotors $220a\sim c$ include I-shaped iron cores $221a\sim c$ and permanent magnets $222a\sim c$ alternatingly positioned along ring-shaped outer sides of the non-magnetic rings $223a\sim c$.

As to the direction of magnetization of the permanent magnet $222a\sim c$ of the same phase, respective phases of two permanent magnets positioned adjacently along the rotational direction (or the axial direction) are preferably different by 180° (the phase difference is 180°).

In the second embodiment, by the I-shaped iron cores $221a\sim c$ and the permanent magnets $222a\sim c$ in the rotors $220a\sim c$, a plurality of magnetic poles (respectively facing the first ferromagnetic unit of the stators $210a\sim c$) positioned along the rotation axis is called "a second ferromagnetic unit".

Figure 6:
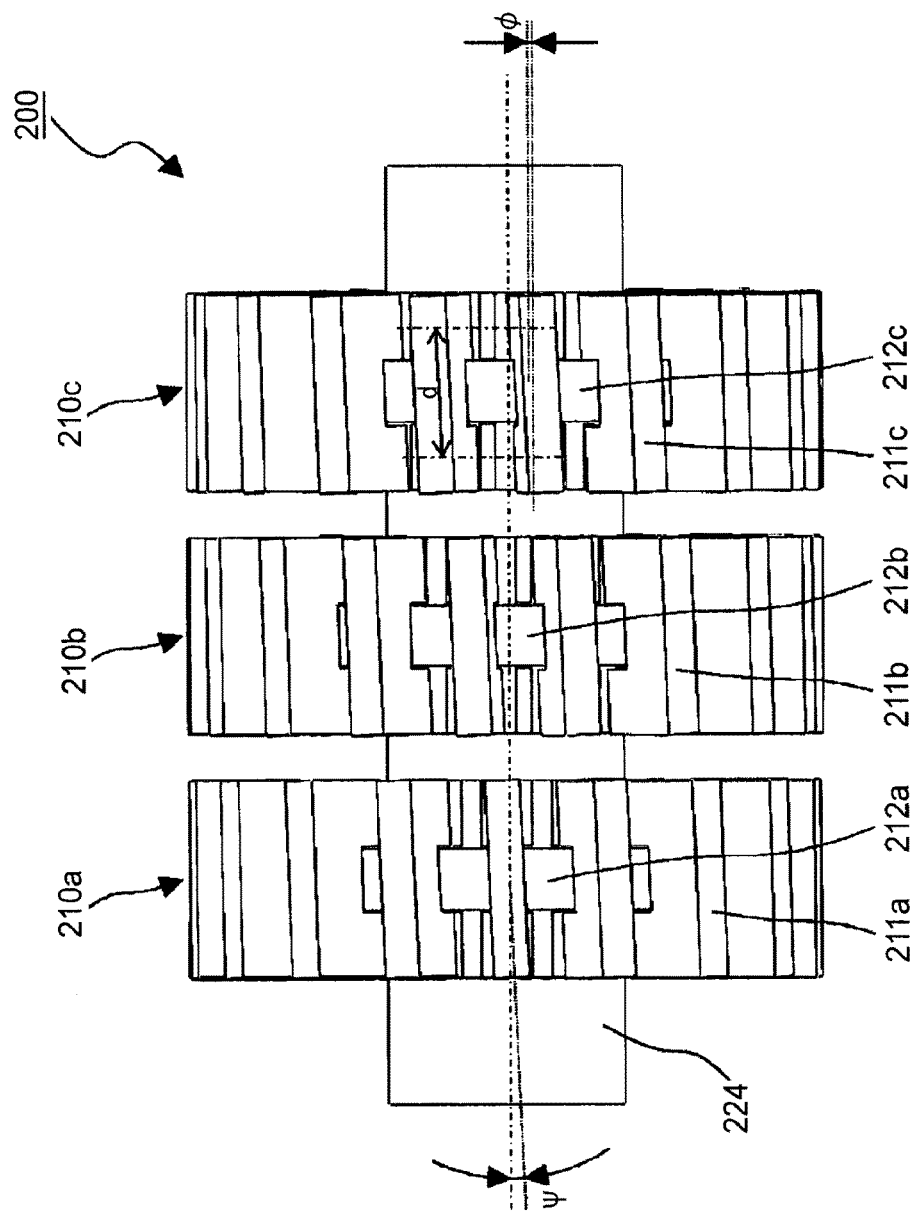
FIG. 6 is a perspective sectional view showing the transverse flux machine according to the second embodiment.

FIG. 6 is a front view showing the transverse flux machine according to the second embodiment.

In the second embodiment, the U-shaped iron cores $211a\sim c$ of the stators $210a\sim c$ are inclined to the rotation axis 224. Namely, respective positions of two magnetic poles of the U-shaped iron core $211a\sim c$ are shifted to the rotational direction. The principle to reduce the torque ripple is same as that of the first embodiment. In order to reduce a torque ripple having a cycle of mechanical angle θ, respective mechanical angles of two magnetic poles are shifted by θ/2.

The number of magnetic poles of the U-shaped iron core $211a\sim c$ along the axial direction is respectively "L=2". For example, if the U-shaped iron core is composed by laminated steel sheets, the number of magnetic poles is "L=M" because of shape-constraint, i.e. "M=2". In order to reduce ripples of harmonic component of the sixth order (N=6) for three-phase structure, by assigning these values to above equation, the respective shifts are the electrical angle "Θ1= (360°/6/2)=30°".

If this is thought with the mechanical angle φ, for example, if the magnetic pole is designed as "one round is 36 poles (i.e., the number of magnetic pole pairs is 18)", a skew angle is determined so as to shift by "φ=(360°/18/6/2)=1.67°". Here, the skew angle φ is different from a tilt angle Ψ of the U-shaped iron core 111a~c. The relationship between the skew angle and the tilt angle is represented as "rφ=d·sin(Ψ)". In this equation, "r" is a distance between the most inner part of the U-shaped iron core 211a~c and a center of the rotation axis, and "d" is a distance between two magnetic poles positioned adjacently ("φ" and "Ψ" are radian-notation).

The relationship between the electrical angle and the mechanical angle is changed by the number of poles of the machine. For example, if the number of poles is 48, the number of magnetic pole pairs is 24, and the mechanical angle φ is "φ=(360°/24/6/2)=1.25°". Furthermore, a-phase, b-phase and c-phase preferably have a shift of the mechanical angle φ, respectively. A phase difference between a-phase and b-phase, a phase difference between b-phase and c-phase, and a phase difference between c-phase and a-phase, are preferably the electrical angle 120° respectively.

As to the electrical angle "Θ1=(360°/N/M)" in above equation, 360° represents the case that the most suitable angle is indicated. However, the angle may have a range. Namely, if an order of harmonic component of torque ripple to be reduced is (N×1), (N×2), . . . , (N×(M−1)) (M and N are integer numbers. M≤L) for the fundamental order of the electrical angle along the rotational direction, among L magnetic poles facing along the axial direction in the first and second ferromagnetic units, a relative position of respective centers of M magnetic poles along the rotational direction may be shifted by the electrical angle "(180°/N/M)< Θ1 < (540°/N/M)" in order (1, 2, . . . , M).

(The Third Embodiment)

Figure 7:
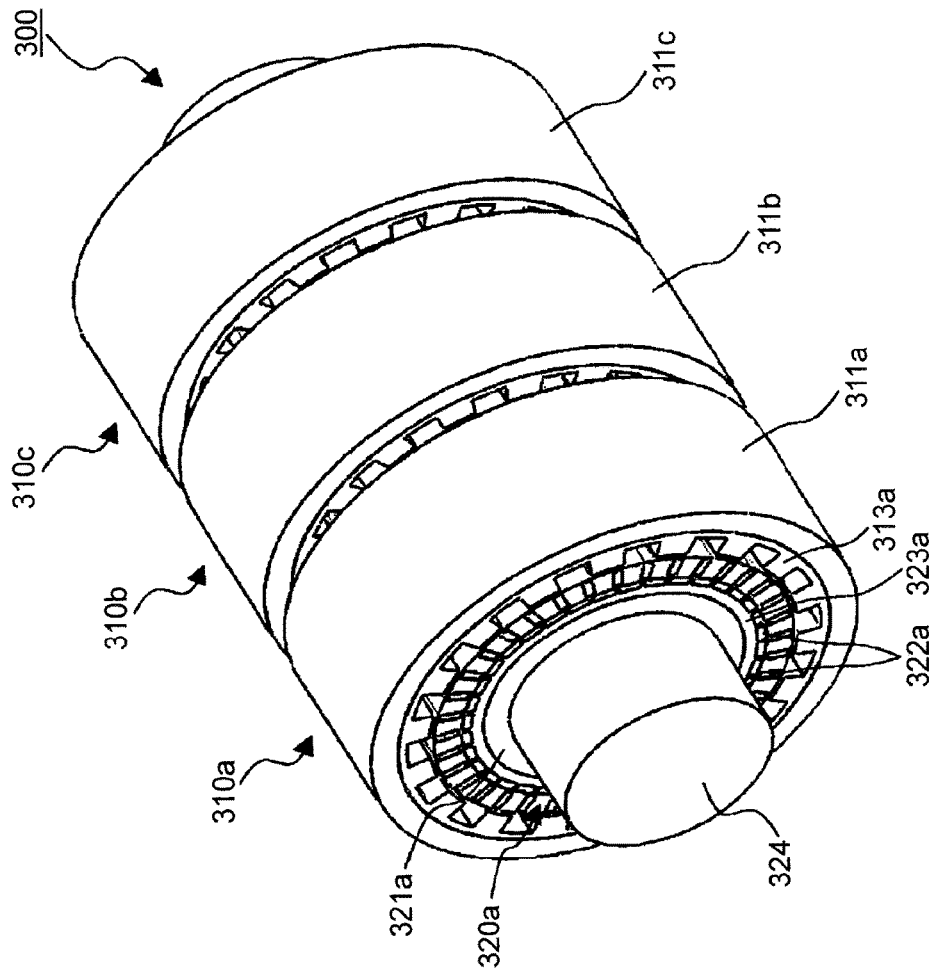
FIG. 7 is a perspective view showing a transverse flux machine according to a third embodiment.
Figure 8:
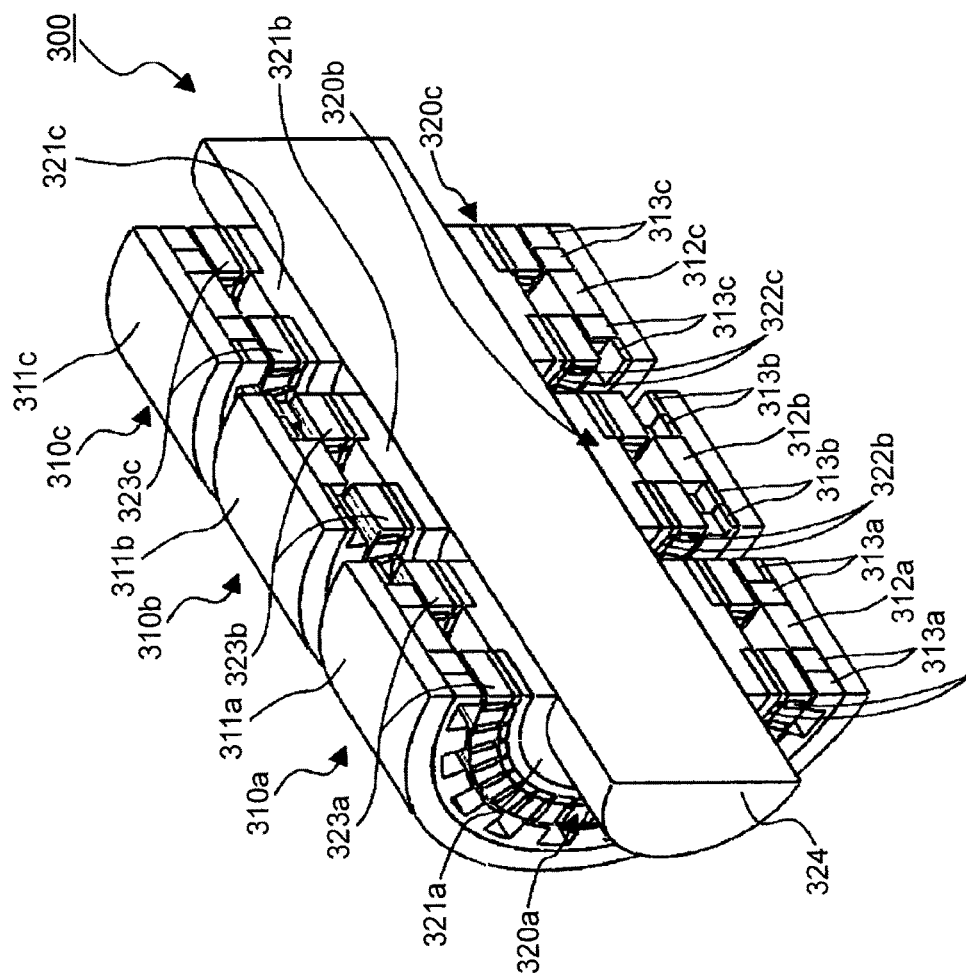
FIG. 8 is a perspective sectional view showing the transverse flux machine according to the third embodiment.
Figure 9:
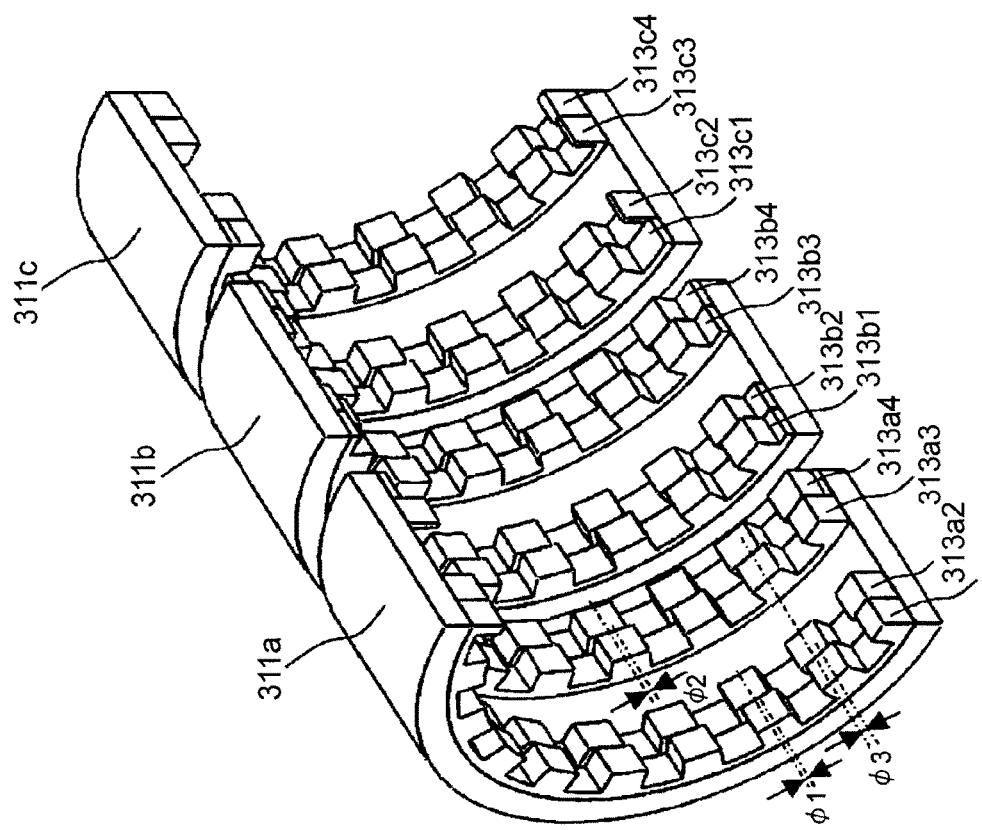
FIG. 9 is a perspective sectional view showing a stator-iron core of the transverse flux machine according to the third embodiment.
Figure 10:
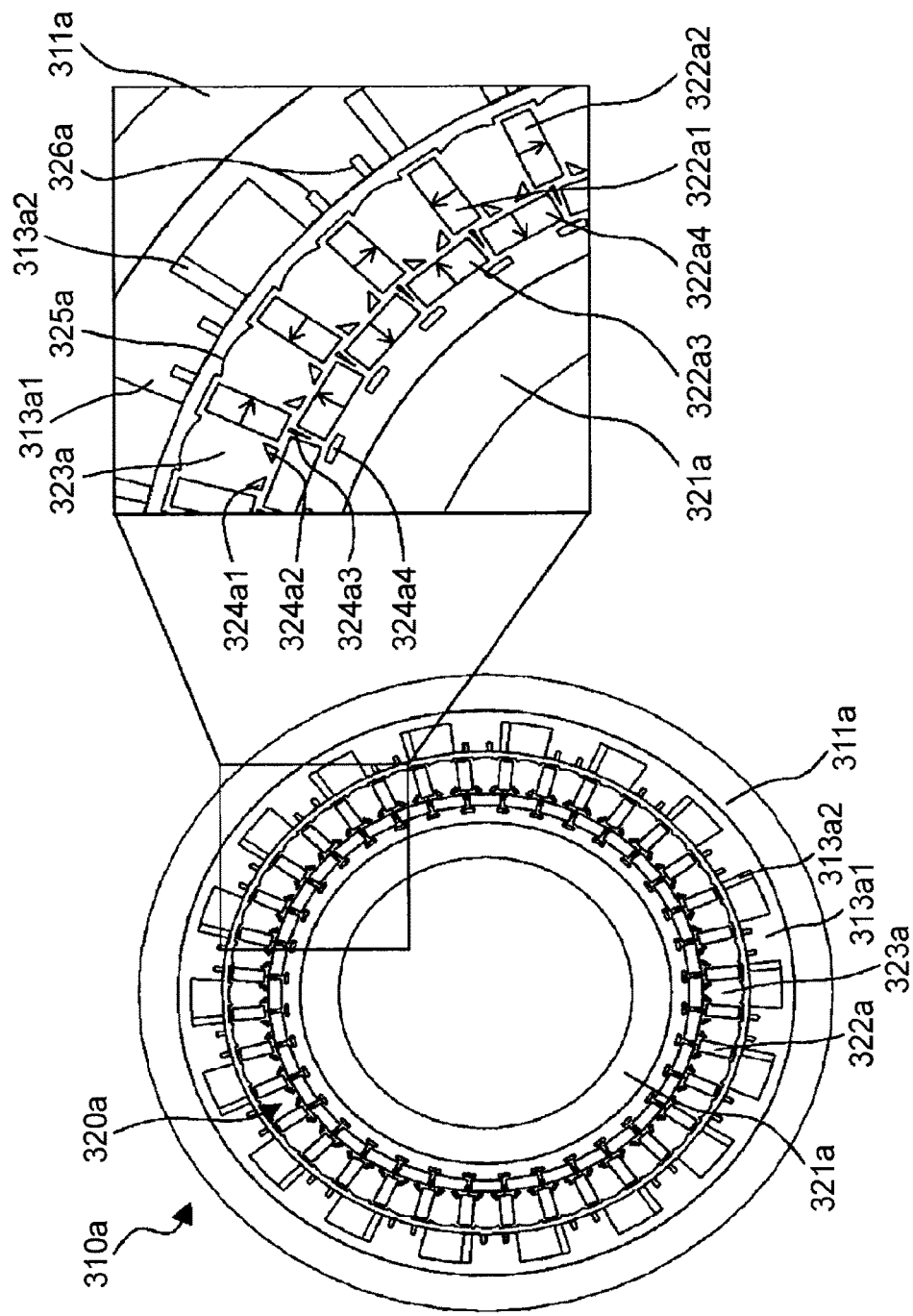
FIG. 10 is a front view showing the transverse flux machine according to the third embodiment.

FIG. 7 is a perspective view showing a transverse flux machine according to the third embodiment. FIG. 8 is a perspective sectional view showing the transverse flux machine according to the third embodiment. FIG. 9 is a perspective sectional view showing a stator-iron core of the transverse flux machine according to the third embodiment. FIG. 10 is a front view showing the transverse flux machine according to the third embodiment.

A transverse flux machine 300 is structured as three-phases, and includes stators 310a~c and rotors 320a~c. A stator 310a and a rotor 320a (both represented by a sign "a") are "a-phase". A stator 310b and a rotor 320b (both represented by a sign "b") are "b-phase". A stator 310c and a rotor 320c (both represented by a sign "c") are "c-phase". These compose "three-phase structure".

The stators 310a~c respectively include one cylindrical bulk-iron core 311a~c. Inside the cylindrical bulk-iron core 311a~c, the stators 310a~c respectively include one ring-coil 312a~c for each phase. Furthermore, the stators 310a~c respectively include two pairs of ring-shaped laminated steel sheets 313a~c so as to hold (sandwich) both sides of the ring-coil 312a~c. In case of a-phase of FIG. 9, two pairs of laminated steel sheets (313a1, 313a2) and (313a3, 313a4) are equipped. In the same way, as to b-phase and c-phase of FIG. 9, two pairs of laminated steel sheets are respectively equipped.

In the respective laminated steel sheets 313a~c, as shown in FIG. 9, a plurality of roughness (concave and convex) is formed along a ring-shaped inner surface thereof. At the respective convex parts, both sides of the ring-coils 312a~c are held (sandwiched). At the respective concave parts, a part of the ring-coils 312a~s faces an air gap. Accordingly, in the stators 310a~c of the third embodiment, the convex parts of the laminated steel sheets 313a~c correspond to magnetic poles.

In the third embodiment, by the laminated steel sheets 313a~c holding a part of the ring-coils 312a~c in the stators 310a~c, a plurality of magnetic poles positioned along the rotational direction is called "a first ferromagnetic unit".

As to respective laminated steel sheets of each pair holding (sandwiching) both sides of the ring-coil 312a~c, two kinds of steel sheets are laminated along the rotational direction. In FIG. 9, as to the left side of each pair of a-phase, two kinds of steel sheets 313a1 and 313a2 are laminated. In the same way, as to the right side of each pair of a-phase, both sides of each pair of b-phase, and both sides of each pair of c-phase, two kinds of steel sheets are laminated along the rotational direction. Accordingly, each magnetic pole is divided into two pieces.

The rotors 320a~c are respectively positioned inside the first ferromagnetic unit (of the stators 310a~c) with an air gap. The rotors 320a~c are rotatable relatively to the stators 310a~c around the rotation axis 224.

The rotors 320a~c respectively include cylindrical bulk-iron cores 321a~c, and laminated steel sheets 323a~c annularly surrounding the cylindrical bulk-iron cores 321a~c. In the laminated steel sheets 323a~c, a plurality of permanent magnets 322a~c is embedded along the rotational direction.

As to the direction of magnetization of the permanent magnet 322a~c of the same phase, respective phases of two permanent magnets positioned adjacently along the rotational direction (or the axial direction) are preferably different by 180° (the phase difference is 180°).

In the third embodiment, by the laminated steel sheets 323a~c and the permanent magnets 322a~c in the rotors 320a~c, a plurality of magnetic poles (respectively facing the first ferromagnetic unit of the stators 310a~c) positioned along the rotation axis is called "a second ferromagnetic unit".

In the third embodiment, the laminated steel sheets 313a~c of two pairs (In case of a-phase of FIG. 9, two pairs are (313a1, 313a2) and (313a3, 313a4). In case of b-phase and c-phase, two pairs have the same component.) holding (sandwiching) the ring-coil 312a~c are inclined to the rotation axis 324 of the rotors 320a~c. Namely, respective positions of two magnetic poles of each pair in the laminated steel sheets 313a~c are shifted to the rotational direction. The principle to reduce the torque ripple is same as that of the first embodiment.

As to skew angles φ1, φ2 and φ3, for example, if the transverse flux machine 300 is designed by 36 poles, "360° (one round)/36 (poles)=10°", i.e., an angle per 2 poles is 20°. Furthermore, the transverse flux machine has three-phase structure. Accordingly, the largest ripple component is the sixth order (N=6), and the cycle is "20°/6=3.33°".

Namely, in order to reduce the ripple of 3.33° cycle (harmonic component of the sixth order), respective angles of two magnetic poles (In FIG. 9, 313a1 and 313a3) along the rotational direction are preferably shifted by "φ3=(3.33°/2)=1.67°".

Furthermore, in the third embodiment, magnetic poles of laminated steel sheets 313a~c of each pair are divided into two pieces by two kinds of laminated steel sheets 313a~c. In FIG. 9, as to the left side of each pair of a-phase, by laminating two kinds of steel sheets 313a1 and 313a2 along the rotational direction, each magnetic pole 322a is divided into two magnetic poles. In the same way, as to the right side of each pair of a-phase, both sides of each pair of b-phase, and both sides of each pair of c-phase, each magnetic pole 322a is divided into two magnetic poles by laminating two kinds of steel sheets along the rotational direction. Namely, by dividing each magnetic pole of laminated steel sheets 313a~c into two pieces, 3.33° cycle (harmonic component of the sixth order) can be further reduced. Two laminated steel sheets of each divided pair {(313a1, 313a2), (313a3, 313a4), . . . } are shifted by "$\phi 1=\phi 2=(3.33°/2)=1.67°$".

By increasing the kind of laminated steel sheets 313a~c, the number of division of each magnetic poles can be also increased. For example, in case of three division, if three steel sheets of each divided group are shifted by "(3.33°/3)×1=1.11°" and "(3.33°/3)×1=1.11°" in order, 3.33° cycle (harmonic component of the sixth order) and 1.67° cycle (harmonic component of the twelfth order) can be simultaneously reduced. In this way, by increasing the number of division, ripples of harmonic component of the higher order can be simultaneously reduced.

The relationship between the electrical angle and the mechanical angle are changed by the number of poles of the machine. For example, if the number of poles is 48, the number of magnetic pole pairs is 24, and above-mentioned $\phi 1$, $\phi 2$ and $\phi 3$ are "(360°/24/6/2)=1.25°". Furthermore, a-phase, b-phase and c-phase preferably have a shift of mechanical angle $\phi 1$, $\phi 2$ and $\phi 3$ respectively. A phase difference between a-phase and b-phase, a phase difference between b-phase and c-phase, and a phase difference between c-phase and a-phase, are preferably the electrical angle 120° respectively.

More generally speaking, if at least one magnetic pole of the first ferromagnetic unit or the second ferromagnetic unit is divided into I pieces (I is integer number) along the rotational direction, and if an order of harmonic component of torque ripples to be reduced is (N×1), (N×2), . . . ,(N×(J−1)) (J is integer number, J≤I) for the fundamental order of an electrical angle along the rotational direction, among I (divided) magnetic poles, a position of respective centers of J magnetic poles along the rotational direction is shifted by the electrical angle "(180°/N/j) <Θ2<(540°/N/J)" in order (1, 2, . . . , J).

In this way, the angle (position of respective centers of J magnetic poles) can have a range. Here, if the most suitable angle is indicated, a position of respective centers of J magnetic poles along the rotational direction is the electrical angle "θ2=(360°/N/J)".

In FIG. 10, on the laminated steel sheet of the machine, the permanent magnet 322a is circularly embedded at a predetermined interval. An arrow shown in each permanent magnet represents a direction of magnetization.

The permanent magnets 322a1 and 322a2 (embedded into a ring-shaped outer side of the laminated steel sheet 323a) are magnetized along the rotational direction. Furthermore, respective directions of magnetization of two permanent magnets 322a1 and 322a2 adjacently positioned are reverse. These are called "first and second permanent magnets".

The permanent magnets 322a3 and 322a4 (embedded into a ring-shaped inner side of the laminated steel sheet 323a) are magnetized along the radial direction. Furthermore, respective directions of magnetization of two permanent magnets 322a3 and 322a4 adjacently positioned are reverse. These are called "third and fourth permanent magnets". Here, the ring-shaped inner side means a position nearer the center side (rotation axis 324) than the first and second permanent magnets 322a1 and 322a2 from a facing surface between the rotor 320a and the stator 310a.

A magnetic flux output from the permanent magnet 322a (embedded into the laminated steel sheet 323a) is input to the permanent magnet 322a via the laminated steel sheet 323a positioned at a side face of the permanent magnet 322a. During this period, the magnetic flux does not pass via the stator 310a, and does not contribute to occurrence of the torque. In FIG. 10, at a part of the laminated steel sheet 323a near each side face of the permanent magnets 322a1~322a4, holes (flux barriers) 324a1~324a4 are equipped. Accordingly, the magnetic flux output from the permanent magnet 322a is hard to pass via the laminated steel sheet 323a positioned at the side face of the permanent magnet 322a, and a larger number of magnetic fluxes operate the stator 310a. As a result, these magnetic fluxes contribute to increase of the torque.

Furthermore, a slot 325a on a facing surface of the laminated steel sheet 323a is deeper at a part near the permanent magnets 322a1 and 322a2. As a result, this slot 325a presents the magnetic flux of the permanent magnets 322a1 and 322a2 from concentrating onto the part near thereto, and the torque ripple can be reduced. Here, from a viewpoint to reduce the torque ripple, slots 325a~c are preferably formed onto the laminated steel sheets 323a~c of all rotors.

Furthermore, by forming a slot 326a onto a facing surface of the laminated steel sheet 313a1 of the rotor, a magnetic flux density at an air gap by the permanent magnet 322 has a distribution similar to sine wave along the rotational direction, and the torque ripple can be reduced. Here, from a viewpoint of reducing the torque ripple, slots 326a~c are preferably formed onto the laminated steel sheets 313a~c of all rotors.

As mentioned-above, according to the transverse flux machine of the third embodiment, when current is not supplied or when current is supplied, the torque ripple for the rotational position can be reduced.

Next, as to the transverse flux machine explained in the first, second and third embodiments, various applications can be added.

For example, if the motor has multiphase structure, the applications can be added. In the first embodiment, the motor having two-phase structure is explained. In the second and third embodiments, the motor having three-phase structure is explained. However, the present principle can be applied to multiphase structure except for two-phase structure and three-phase structure. Namely, in the transverse flux machine of the first, second, and third embodiments, a plurality of pairs of the rotor and the stator is equipped. As to a relative positional relationship between the rotor and the stator along the rotational direction, these pairs can be composed as respective different pairs.

Furthermore, an iron core material having a magnetic anisotropy may be used. The magnetic anisotropy is a property that ease of magnetization is different by the direction. Namely, in the transverse flux machine of the first, second and third embodiments, at least one of the first and second ferromagnetic units may prepare a ferromagnetic at least one part of which has the magnetic anisotropy.

Figure 11:
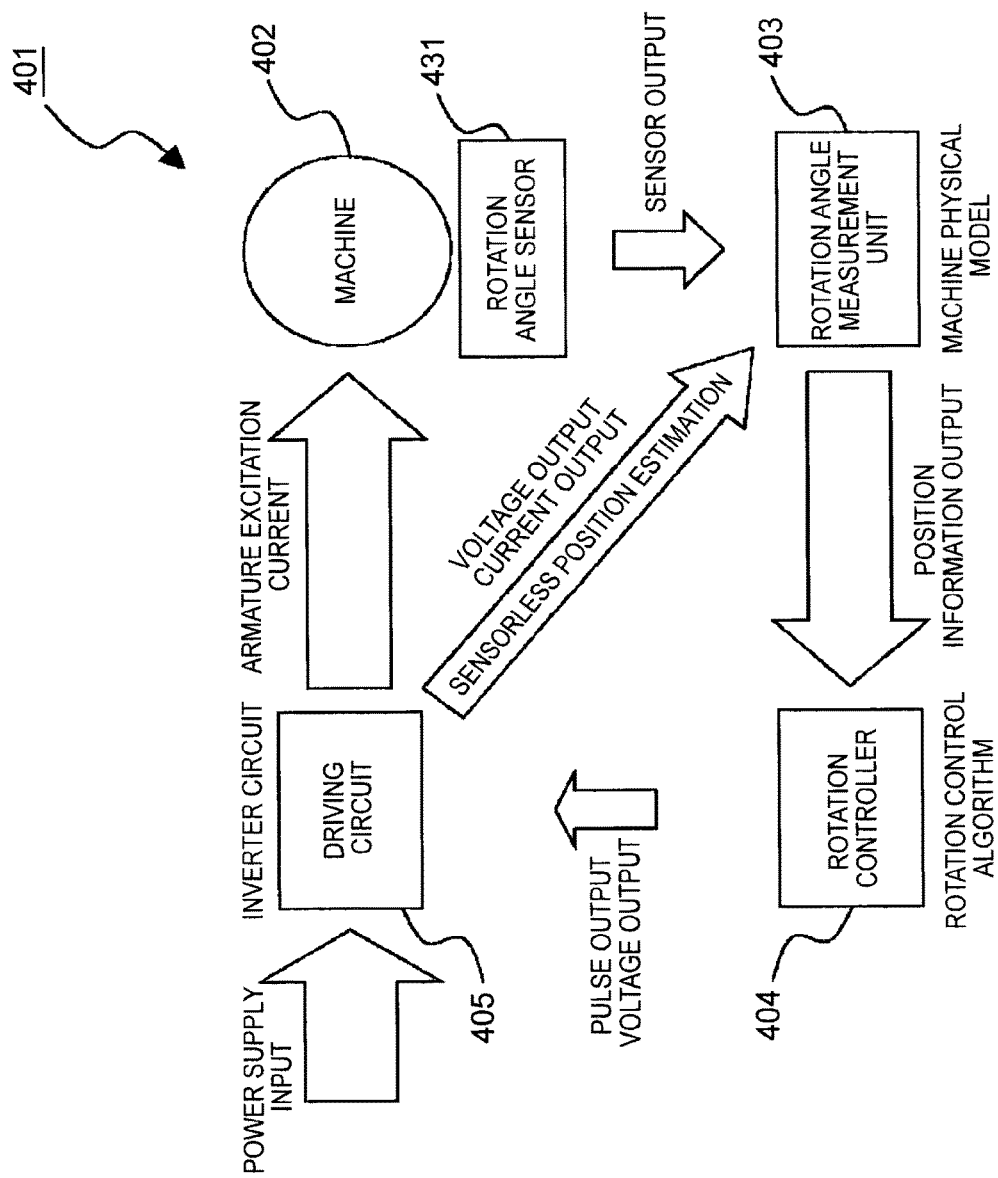
FIG. 11 is a block diagram of a machine driving system.

FIG. 11 is a block diagram of a machine driving system. As shown in FIG. 11, by a sensor output from a rotation angle sensor 431 (such as an encoder) or by a sensorless position estimation (an output voltage, an output current) from a driving circuit 405, angle feedback control can be performed. Namely, in the transverse flux machine of the first, second and third embodiments, the transverse flux machine having following units can be composed. A rotation angle measurement unit 403 measures a rotation angle around a rotation axis of the rotor. A rotation controller 404 controls amperage to be flown along a ring-coil, based on a position information output (as a signal from the rotation angle measurement unit 403) and a rotation control algorithm. A driving circuit 405 (an inverter circuit accepting a power supply input) supplies an armature excitation current to the machine 402, based on a pulse output and a voltage output from the rotation controller 404.

Figure 12:
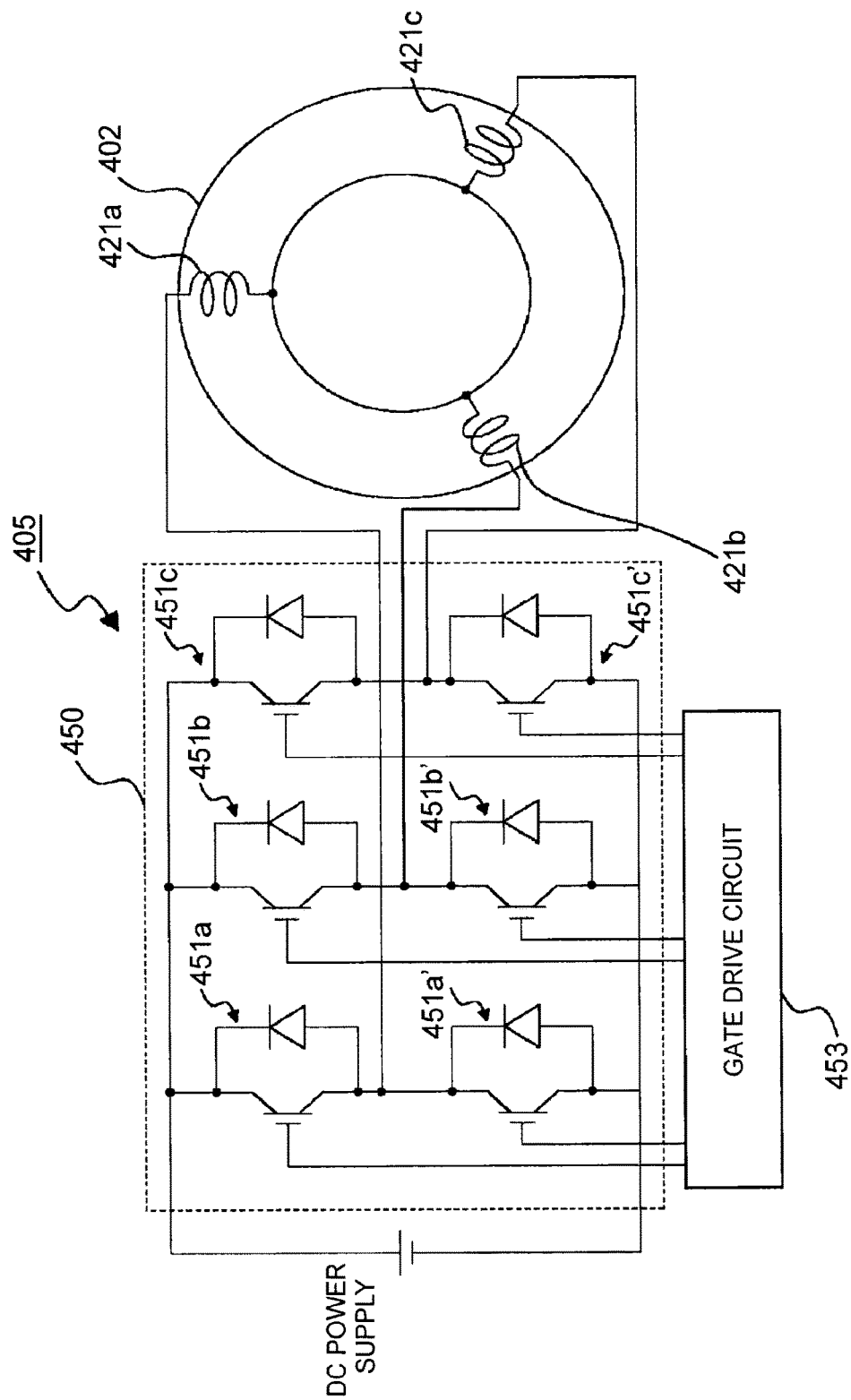
FIG. 12 is a block diagram showing component of a driving circuit in the machine driving system.

FIG. 12 is a block diagram showing component of the driving circuit 405. As shown in FIG. 12, the driving circuit 405 prepares a switching circuit 450 including a plurality of switching units 451*a~c* and 451*a'~c'* (For example, an IGBT and a diode), and a gate drive circuit 453 driving these switching units. The switching units 451*a~c* and 451*a'~c'* are respectively connected to ring-coils 421*a~c* of each phase via a bridge. Here, three-phase connection is imagined. However, even if the number of phases of connection is not three, the switching circuit corresponding to the number of phases can be applied in the same way. Furthermore, the current may be supplied to the ring-coils 421*a~c* by applying a power amplifier circuit (not shown in FIG. 12) thereto.

Figure 13:
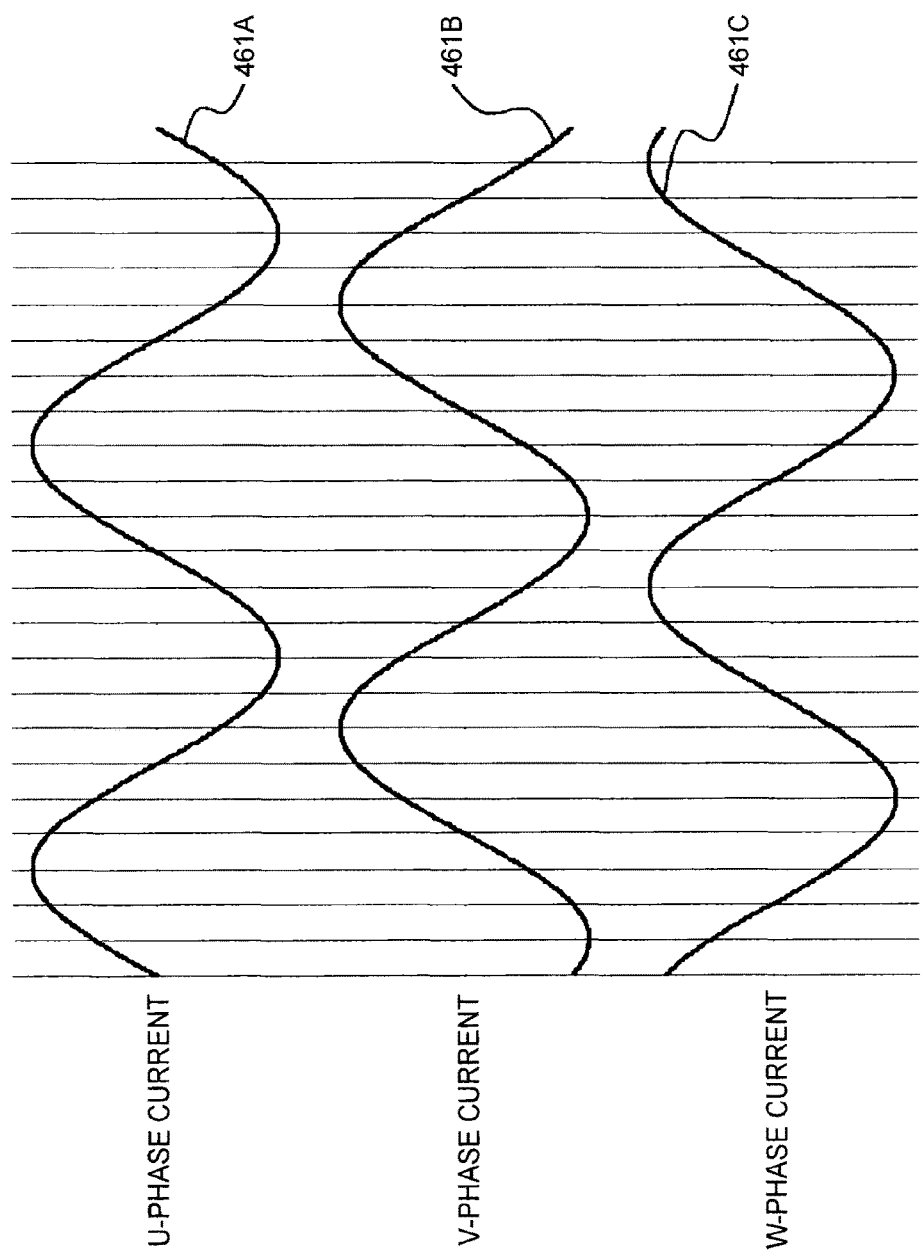
FIG. 13 is a graph showing one example of current flowing along a ring-coil.
Figure 14:
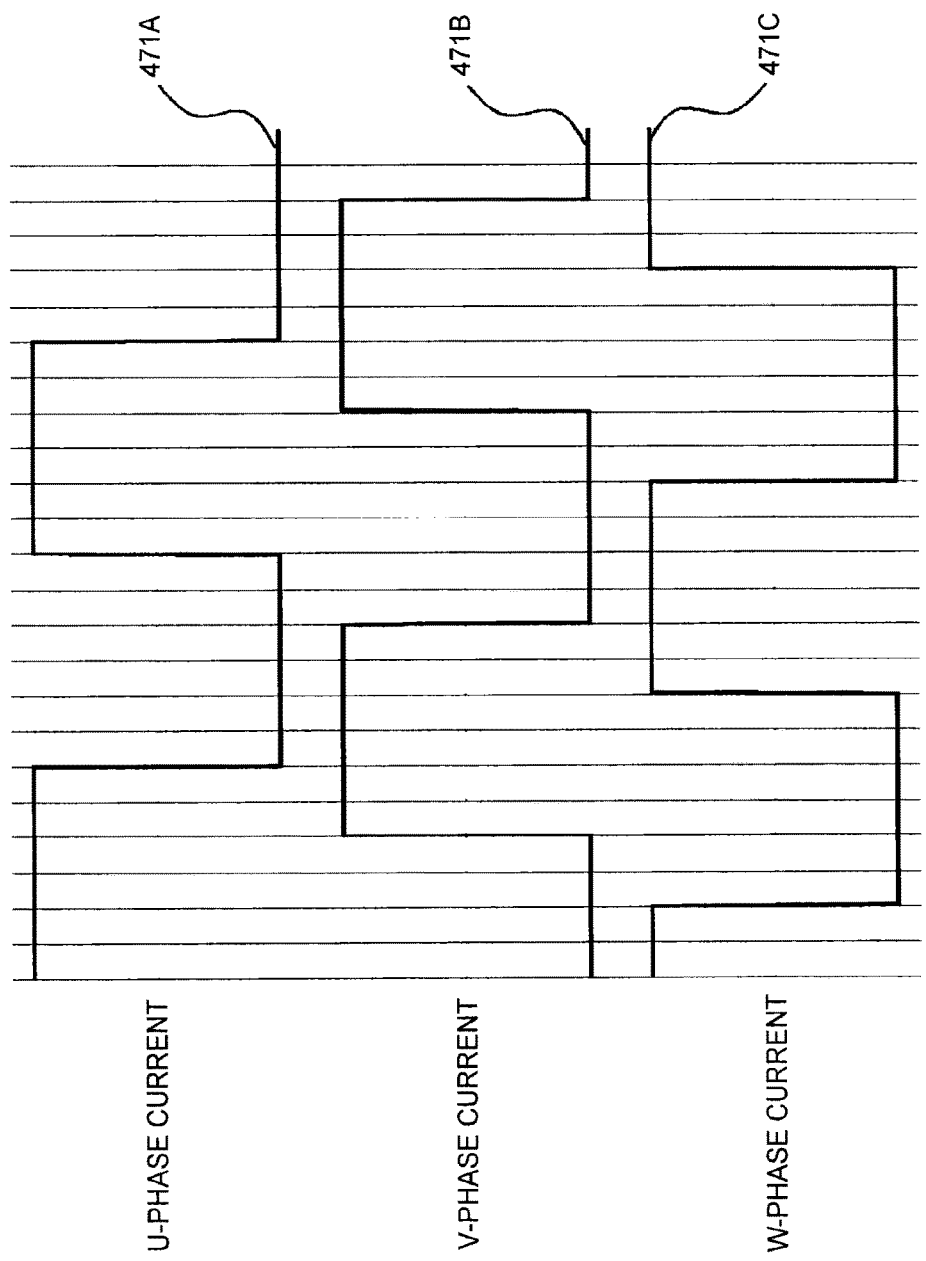
FIG. 14 is a graph showing another example of current flowing along the ring-coil.

FIG. 13 is a graph showing one example of the current flowing through the ring-coil. FIG. 14 is a graph showing another example of the current flowing through the ring-coil. Both FIGS. 13 and 14 show examples of the current flowing through the ring-coil 421 having three-phase connection. In FIG. 13, if PWM control using the switching circuit 450 (shown in FIG. 12) is applied, or if an output of the power amplifier circuit (not shown in FIGS. 0.12 and 13) is applied, three-phase current (U-phase current 461A, V-phase current 461B, W-phase current 461C) are shown. Actually, the three-phase current 461A~C includes noise. In FIG. 13, the fundamental wave components respective phases of which are different by 120° are shown. With a velocity corresponding to a frequency of this fundamental wave, the rotor is driven.

In FIG. 14, pulse control using the switching circuit 450 (shown in FIG. 12) is performed. Three-phase current (U-phase current 471A, V-phase current 471B, W-phase current 471C) of rectangular waves respective phases of which are different by 120° is supplied.

Furthermore, the machine of the embodiments is not limited to a radial gap motor in which a normal line of a facing surface between the rotor and the stator is along the radial direction (this example is explained in the first, second and third embodiments). The machine of the embodiments may be an axial gap motor in which the normal line of the facing surface between the rotor and the stator is along the axial direction. In the axial gap motor, the ring-coil is held (sandwiched) not along the axial direction but along the radial direction.

Furthermore, the machine of the embodiments is not limited to an inner rotor meaning the rotor is positioned inside the stator (this example is explained in the first, second and third embodiments). The machine of the embodiments may be an outer rotor meaning the rotor is positioned outside the stator While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transverse flux machine comprising:
   a stator including a winding wound along a rotational direction of a rotation axis, and a first ferromagnetic unit having L (L is integer number) magnetic poles holding the winding; and
   a rotor rotatable relatively to the stator around the rotation axis, the rotor including a second ferromagnetic unit divided into L pieces, the L pieces having L magnetic poles facing the L magnetic poles of the first ferromagnetic unit;
   wherein
   if an order of harmonic component of torque ripple to be reduced is (N×1), (N×2), . . . , (N×(M−1)) (M and N are integer numbers. M≤L), among the L magnetic poles in the first and second ferromagnetic units, a relative position of M magnetic poles along the rotational direction is shifted by $\Theta 1$ (($180°/N/M$)< $\Theta 1$ < ($540°/N/M$)) in order,
   magnetic poles of at least one of the first and second ferromagnetic units are divided into I pieces (I is integer number) respectively,
   if the order of harmonic component of torque ripple to be reduced is (N×1), (N×2), . . ., (N×(J−1)) (J is integer number, J≤I), among I magnetic poles divided, a relative position of J magnetic poles along the rotational direction is shifted by $\Theta 2$ (($180°/N/J$)< $\Theta 2$ < ($540°/N/J$)) in order.

2. The transverse flux machine according to claim 1, wherein
   the relative position of M magnetic poles along the rotational direction is shifted by $\Theta 1=(360°/N//M)$) in order.

3. The transverse flux machine according to claim 1, wherein
   the relative position of J magnetic poles along the rotational direction is shifted by $\Theta 2=(360°/N/J)$) in order.

4. The transverse flux machine according to claim 1, wherein
   the first ferromagnetic unit or the second ferromagnetic unit includes an electrical steel sheet laminated along the axial direction,
   first and second permanent magnets magnetized along the rotational direction are embedded into the electrical steel sheet,
   third and fourth permanent magnets magnetized along the radial direction of the rotation axis are embedded into the electrical steel sheet,
   respective directions of magnetization of the first and second permanent magnets are reverse,
   respective directions of magnetization of the third and fourth permanent magnets are reverse,
   the third and fourth permanent magnets are farther than the first and second permanent magnets from a facing surface between the rotor and the stator,
   the electrical steel sheet includes holes at farther positions than the first and second permanent magnets from the facing surface, and
   an inner surface of the electrical steel sheet is surrounded by the third and fourth permanent magnets, and the first and second permanent magnets via the holes.

5. The transverse flux machine according to claim 1, further comprising:
   a plurality of pairs of the rotor and the stator;
   wherein a relative position between the rotor and the stator of each of the pairs along the rotational direction is different among the pairs.

6. The transverse flux machine according to claim 1, wherein
at least one of the first and second ferromagnetic units includes a ferromagnetic in which at least one part has a magnetic anisotropy.

7. The transverse flux machine according to claim 1, further comprising:
a measurement unit that measures a rotation angle of the rotor around the rotation axis: and
a controller that controls an amperage to be flown along the winding, based on a signal from the measurement unit.

* * * * *